UNITED STATES PATENT OFFICE.

JACK CHURCHWARD, OF NEW YORK, N. Y., ASSIGNOR TO WILSON WELDER & METALS COMPANY, INC., A CORPORATION OF NEW YORK.

WELDING CAST-IRON.

1,389,476.   Specification of Letters Patent.   Patented Aug. 30, 1921.

No Drawing.   Application filed October 27, 1920.   Serial No. 419,905.

*To all whom it may concern:*

Be it known that I, JACK CHURCHWARD, a citizen of the United States, and a resident of the city, county, and State of New York, have invented certain new and useful Improvements in Welding Cast-Iron, of which the following is a specification.

This invention relates to welded joints and to welding processes for producing them and is herein described as applied to the welding of cast iron, with the production of welded joints which are adapted to be machined in many of the ordinary machining processes to which cast iron is subjected, even though the cast iron is not preheated before welding or annealed after welding.

Unless the cast iron was preheated or annealed to modify its structure it has hitherto been supposed that a cast iron welded joint usually was inherently weak, and it has been found that if welds were produced of any considerable degree of strength, they were produced by methods which involved the formation of extremely hard or brittle areas, with the result that the welded joint could not be subjected to machining as in milling machines, lathes or shapers with the rest of the casting.

By taking suitable steps in working and utilizing an electrode which has the property of controlling the disposition of carbon in the cast iron or which combines with the carbon so that no unmachinable compound, such as free cementite is formed, I have been able to make a weld substantially free from unmachinable areas. As will appear below, the carbon in the cast iron, which tends to make compounds prejudicial to machining, can be inhibited from forming such compounds, apparently being absorbed by the deposited alloy of the electrode, without injuriously affecting the strength of the weld, or forming an unmachinable area in the deposited alloy of the weld. In some instances it is not necessary that the entire weld should be composed of an alloy having carbon absorbing properties. If a layer of sufficient thickness of a metal having carbon absorbing properties is welded to the cast iron it is possible to make a machinable weld by thereafter welding on to the first layer subsequent layers of a metal, such as steel, which, if welded directly to the cast iron, would produce hard or brittle areas so that the joint would be incapable of being machined. A piece of cast iron was prepared for welding by the metallic arc process of electric welding employing an electrode $\frac{5}{32}$ inch in diameter and having the following analysis: copper 53.54, nickel 44.31, the remainder probably iron. This electrode was coated with a material adapted to aid the flowing qualities of the electrode, consisting of a thick pasty mixture of lime and water, applying the water-lime mixture on with a brush. A bead of the alloy was welded to the iron using 140 amperes and 45 volts. This bead of welded-on alloy was then peened or hammered with a 2-pound machinist's hammer, beginning the peening at the hot end of the bead while still red-hot and working back over the colder part, reaching the end of the bead, however, while it was still hot. Other beads were similarly welded-on successively until the surface was covered, each bead being peened. Then beads were welded and peened on the peened and welded surface until the weld was complete. For all layers of beads above the one welded direct to the iron, 180 amperes was used, the voltage remaining unchanged.

The piece of cast iron thus welded was set up in a shaper of an ordinary commercial type, and the surface of the weld shaped down together with the surface of the iron. It was found that there was no hard spot present which would interfere with the machining of the iron in any way on the shaper.

In test welds similar to this, areas directly adjacent to the deposited metal showed characteristics of a high carbon steel, approximately one per cent. carbon, the formation apparently corresponding to what is technically known as sorbitic pearlite, the graphite seemingly having been absorbed by the first deposited welded-on alloy material. Free cementite, or iron of the cementitic eutectic or white iron type appeared to be substantially absent. The layer of alloy representing the beads deposited directly on the surface of the cast iron showed under the microscope a structure differing notably from the upper layers, apparently due to the absorption of carbon from the iron by the alloy.

A piece of cast iron about 12 inches square and an inch and a quarter thick was put in a lathe, and in the center of one face a hollow was turned, the diameter of the top being three inches, the depth being one half inch. The sides were beveled to a forty-five degree angle. The size of this piece of cast iron insured the rigidity of the portion to be welded. A weld filling this hollow was made by the metallic arc process of electric welding employing an electrode five thirty-seconds of an inch in diameter and having the following analysis: Copper 29%, nickel 68.4%, iron 2.07%, aluminum 0.28%, silicon 0.03%, only a trace of manganese was present. Carbon and sulfur and some metals in the form of oxids were also present.

This electrode was coated as above. One of the sloping sides of the hollow was then partly coated by welding on to it in a general radial direction, a bead of the alloy, using 140 amperes and 45 volts. This bead of welded alloy was then peened as above. Then along other radial lines on the sloping sides of the hollow were welded beads of the alloy using the same amperage and voltage, each bead being hammered or peened when completed, and this was continued so that the beads of welded alloy first looked like the spokes of a large hubbed wheel, and then as the area between them was filled up by other beads of welded and peened alloy, the whole of the sloping sides of the hollow was covered with a layer of alloy welded in place.

Next similar radial beads of alloy were welded to the bottom of the hollow and successively peened, and then in the intervals between these radial beads other beads were welded on and peened until the entire surface of the hollow was covered with a layer of welded-on and peened alloy. This produced a continuous weld of alloy between two opposing faces of the hollow, thus forming a weld holding together two rigidly held faces of iron. Additional beads of the same alloy were now welded into the hollow using 180 amperes and 45 volts, each bead being peened as before successively. Thus superposed layers of alloy were welded on, all at the latter amperage and voltage until the hollow was more than filled.

It was found that there was no deleterious effect on the welded joint from the shrinkage strains set up by cooling of the cast iron body, although these would have pulled away welded-on metal deposited from a steel electrode. Apparently any shrinkage strains set up between the rigid faces of the cast iron were taken care of by the deposited metal as a result of its inherent qualities. Thus the advantages of the modified structure produced by preheating or annealing the cast iron were obtained at the weld, without the warping or other objectionable results ensuing from annealing.

In order to ascertain the tensile strength of a cast iron welded joint of this character two one and one-quarter inch square bars of cast iron having double beveled 45° angle ends were separately coated with the alloy described above, using 140 amperes and 42 volts for the first layer of alloy, the alloy being laid on in beads, and each bead being peened as described above. After the two bars had their beveled ends thus coated, these ends were set with their coated points adjacent each other and the two bars welded together by depositing beads of alloy at 180 amperes and 42 volts, beginning at the bottom of the V formed by the adjacent beveled surfaces. Each bead was peened, as described above, using a calking tool for the superposed beads of alloy nearest the junction of the iron bars. The superposed beads of alloy were deposited in horizontal lines substantially parallel to the axes of the cast iron bars. After this weld had been completed, the bars together with the weld were shaped down to one inch square, no oil being necessary in the shaping. The bars thus reduced were set up in a testing machine, and the tensile strength of the weld was such that the iron bar broke outside the weld at a strain of about 10,040 pounds to the square inch without the weld showing any signs of yielding.

To ascertain the resistance of such a weld to shocks, a hole five inches in diameter in a cast iron plate one and one-quarter inches thick, the hole tapering inwardly 45° angle, was filled by welding into it a one inch steel plate, tapered in the opposite direction, which fitted loosely in the hole in the cast iron plate, so that when inserted in the cast iron plate, the smaller plate formed an annular V-shaped groove surrounding plate, having sides sloping at about 45°. The edges of the steel plate were separately coated with welded alloy, deposited upon it in beads and peened as described above, before being placed within the cast iron plate opening, and the sides of the opening in the cast iron plate were also coated with alloy deposited in beads and peened in the same manner, before any attempt was made to hold the steel plate in position by the deposited alloy. As described for the other tests above, the first layer of alloy was deposited at 140 amperes. The bead between the two plates was filled up by depositing the alloy in successive superposed beads, deposited at 180 amperes, each separately peened, the bead of deposited alloy extending parallel to the flat face of the plate. The steel plate was welded flush with the bottom of the latter. After the weld was completed the cast iron plate was turned over upon a flat solid support. The thinner steel plate while thus held clear of the support by the thicker cast iron was struck heavily with a sledge hammer until the cast iron plate broke, the break occurring at a considerable distance, nearly three inches, away from the weld. This hammering, while sufficient to break the cast iron plate, was insufficient to cause any signs of strain in the weld holding the two plates together. Two bars of cast iron one and one-quarter inches in cross section were prepared for welding by cutting each bar to a point so when the points were put in juxtaposition the angle of the two faces was about 90°. To the end of each bar was welded a layer from an electrode having the following analysis: Copper 29%, nickel 68.4%, iron 2.07%, aluminum 0.28%, silicon 0.03%, the balance being made up of a trace of manganese, carbon sulfur and some other metals in the form of oxids. The layer was deposited in the form of beads, and each bead was peened while hot. The two bars, after the ends has been coated as above, were brought into juxtaposition with the points touching, and additional layers were welded from an electrode having the following analysis: Carbon .10%, manganese .45%, phosphorus, sulfur and silicon under .05%, balance iron.

Care was taken that none of the layers subsequent to the first layer came into direct contact with the cast iron, the subsequent layers being welded only to the first layer. As each subsequent layer was welded it was peened. A sufficient number of layers from the second electrode were added to build the test piece up to a size not quite equal to the cross section of the cast iron so that the test piece was smaller in cross section at the weld than at any other point. Upon being tested, the piece broke in the cast iron and outside of the weld. Another piece was prepared, in a manner similar to the one above, with the exception, however, that the test piece was built up so that it was greater in cross section than the cast iron pieces to be welded. This piece was put in a shaper, and although the greater portion of the metal in the weld was metal from the second electrode, nevertheless, the weld was found to be machinable. Not only has welding according to the present invention proved satisfactory in the cases described above, but it has proved satisfactory in building out a broken off portion of castings.

It has been found that the above described process of welding produces machinable welds of merchantable strength in malleable iron castings.

The examples set forth above are subject to change to suit the needs of varying working conditions and different materials within the scope of the invention.

I claim:

1. A process of welding commercial cast iron showing the structure of unannealed iron which includes welding to the iron a layer of metal adapted to absorb carbon from the iron sufficiently to substantially inhibit the formation of free cementite.

2. A process of welding commercial cast iron showing the structure of unannealed iron which includes welding to the iron a layer of metal adapted to absorb carbon from the iron sufficiently to substantially inhibit the formation of free cementite and adapted to form therewith a machinable weld.

3. A process of welding commercial cast iron showing the structure of unannealed cast iron which includes depositing upon the iron a metal adapted to substantially inhibit the formation of free cementite.

4. A process of welding commercial cast iron showing the structure of unannealed cast iron which includes depositing upon the iron a metal adapted to absorb carbon from the iron to substantially inhibit the formation of non-machinable areas.

5. A process of electrical arc welding commercial iron showing the structure of unannealed cast iron which includes flowing the electric current through a metallic electrode adapted to deposit its metallic body upon the iron so as to inhibit the formation of non-machinable areas.

6. A process of electrical arc welding a first metal having a property modifying impurity therein, which includes flowing the electric current through a metallic electrode adapted to deposit its metallic body upon the first metal in the form of a second metal and also adapted to control modification of the combination of the first metal with its impurities.

7. A process of electrically welding together rigidly held pieces of commercial cast iron which includes depositing on the iron an alloy in a layer so that the alloy forms substantially the whole area adhering to the iron, peening the layer in comparatively small sections as it is deposited, superposing subsequent layers of alloy metal, and peening to cover each lower layer, with the result that the layers are welded solidly to the iron.

8. The process of welding together two rigidly held cast iron faces which includes depositing on the facing surfaces a layer of a metal adapted to inhibit modifications prejudicial to machining, peening said layer in comparatively small sections as it is deposited, depositing additional layers of said metal to complete the union, and peening said additional layers so that said metal forms substantially the whole weld area welded to the surfaces.

9. The process of welding rigidly held cast iron faces to each other which includes depositing on the faces, beads of a welding metal adapted to absorb carbon, peening the beads successively as deposited, depositing the welding metal to fill the remaining areas of the faces between the beads, peening said areas successively, and depositing welding metal in successive layers to complete the weld.

10. The process of electrically welding rigidly held cast iron faces to each other which includes depositing on the faces beads of a welding metal adapted to absorb carbon, peening the beads successively as deposited, depositing the welding metal to fill the remaining areas of the faces between the beads, peening said areas successively, and depositing welding metal in successive layers to complete the weld, peening each layer on successively deposited lines as the weld progresses.

11. A welded joint in commercial cast iron showing the structure of unannealed iron, including a metal welded to the iron and forming a joint with the iron containing a layer of steel and free enough from free cementite to be machined.

12. A welded joint in commercial cast iron showing the structure of unannealed iron including a metal welded to the iron and forming a joint with the iron which is substantially free from iron having the characteristics of cementitic eutectic.

13. A welded joint in commercial cast iron substantially free from free cementitic eutectic including a layer of copper-nickel alloy forming substantially the entire area welded to the iron, and having a correspondingly modified layer of alloy next the iron.

14. A welded joint in cast iron showing the structure of unannealed cast iron including a layer of a second ductile metal adapted to yield to the shrinkage incidental to cooling of the hot joint when welded, and forming substantially the whole area welded to the cast iron and showing a modified layer along the cast iron, corresponding to a modification of an opposing layer of the iron.

15. A welded joint in cast iron including a layer of a second metal adapted to inhibit modifications of the cast iron prejudicial to machining by forming a correspondingly modified layer next to the iron, and adapted to yield to the shrinkage incidental to the cooling of the hot joint when welded and forming substantially the whole area welded to the cast iron.

16. A welded joint in cast iron including a series of superposed welded-on layers of a second metal adapted to inhibit modifications of the cast iron prejudicial to machining and adapted to yield to the shrinkage incidental to the cooling of the hot joint when welded, and forming substantially the whole area welded to the cast iron.

17. A welded joint in cast iron including a layer of a second metal adapted to inhibit modifications of the cast iron prejudicial to machining, and yielding to the shrinkage incidental to the cooling of the hot joint when welded, and also including other layers overlying the first layer and filling any cracks, so that the superposed layers form substantially the whole area welded to the cast iron.

18. A cast iron weld comprising a copper-nickel layer welded to the iron.

19. A cast iron weld comprising a layer of copper-nickel alloy modified by the constituents of the cast iron and lying adjacent the iron.

20. A cast iron weld having the structure characteristic of unannealed cast iron away from the weld juncture and having a layer of copper-nickel alloy modified by the constituents of the cast iron and lying adjacent the iron.

21. A cast iron weld having the structure characteristic of unannealed cast iron away from the weld juncture and having a layer of copper-nickel alloy modified by the constituents of the cast iron and lying adjacent the iron, and superposed layers of unmodified copper-nickel alloy above the modified layer.

22. A process of welding commercial cast iron, without substantial preheating, which consists in welding to the iron a layer of metal adapted to absorb carbon from the iron sufficiently to substantially inhibit the formation of free cementite.

23. A process of welding commercial cast iron, without substantial preheating, which consists in welding to the iron a layer of metal adapted to absorb carbon from the iron sufficiently to substantially inhibit the formation of free cementite, and adapted to form therewith a machinable weld.

24. A process of welding commercial cast iron, without substantial preheating, which consists in welding to the iron a layer of metal adapted to absorb carbon from the iron sufficiently to substantially inhibit the formation of non-machinable areas.

25. A process of electrical arc welding of cast iron, without substantial preheating, which consists in applying an electric current through a metallic electrode adapted to deposit its metallic body on the iron so as to inhibit the formation of non-machinable areas.

26. A process of electrically welding together rigidly held pieces of commercial cast iron, without substantial preheating, which includes welding a layer on the iron with a copper-nickel alloy so that the alloy covers the whole area to be welded, peening the layer in comparatively small sections as it is deposited, superposing subsequent layers of an alloy different from the alloy of the first electrode, and peening the layers with the result that the layers are welded solidly to the iron.

27. The process of welding cast iron which includes depositing upon the surface of the metal to be welded a layer of a metal adapted to inhibit modifications prejudicial to machining, and thereafter welding additional layers to the first layer of a metal, which if welded to the cast iron direct, would form with the cast iron non-machinable areas.

28. A process of welding cast iron which consists in welding to the face of the cast iron a layer of a metal adapted to inhibit modifications prejudicial to machining, peening said layer, and welding on the first layer successive layers of metal from a steel electrode.

29. The process of electrically welding cast iron with a steel electrode which consists in first welding on the cast iron a layer of another metal, and thereafter depositing the metal from the steel electrode so that the metal from the steel electrode is at no time in direct contact with the cast iron.

30. The process of welding cast iron which consists in welding to the cast iron a layer of a metal adapted to inhibit the formation of free cementite, and thereafter welding to said layer a layer of a metal which if welded directly to the cast iron would cause the formation of free cementite.

31. The process of welding cast iron which consists in welding to the surface of the iron a layer of a welding metal of a nickel-copper alloy, and thereafter welding to the first layer successive layers of a welding metal comprised principally of steel.

32. A welded joint in commercial cast iron including metal welded to the iron of a nickel-copper alloy, and layers welded to the first layer of steel alloy and free enough from free cementite to be machined.

33. A welded joint in cast iron including the layer of a metal from a welding electrode adapted to inhibit modifications of the cast iron prejudicial to machining and adapted to yield to the shrinkage incidental to the cooling of the hot joint, and a second layer of a metal containing a large proportion of steel.

34. The method of welding cast iron with a steel electrode which consists in welding to the cast iron a layer of metal from a nickel-copper electrode of sufficient thickness whereby the subsequent layers from the steel electrode are separated from the cast iron sufficiently to prevent the formation of free cementite.

35. The process of welding cast iron without substantial preheating which consists in welding to the iron a layer from an electrode of a nickel-copper alloy, and subsequently welding to the first layer layers from an electrode of a steel alloy.

36. The process of welding cast iron without substantial preheating which consists in welding to the iron a layer from an electrode of a nickel-copper alloy.

37. A welded joint in commercial cast iron having a layer adjacent the cast iron of a nickel-copper alloy.

38. The process of welding cast iron without substantial preheating which consists in welding to the iron metal of a nickel-copper alloy, and welding to the first layer metal of a steel alloy.

39. A cast iron weld having a machinable stratum in the cast iron adjacent the weld, and also having a machinable stratum in the weld material adjacent the cast iron.

40. The process of welding cast iron which comprises flowing from an electrode onto the iron, a welding metal adapted to form a machinable stratum in the weld adjacent the iron and to leave a machinable stratum in the adjacent cast iron body.

In testimony whereof, I have affixed my signature to this specification.

JACK CHURCHWARD.